United States Patent
Naylor et al.

(10) Patent No.: US 12,260,866 B2
(45) Date of Patent: Mar. 25, 2025

(54) SYSTEM AND METHOD FOR WATERMARKING AUDIO DATA FOR AUTOMATED SPEECH RECOGNITION (ASR) SYSTEMS

(71) Applicant: Microsoft Technology Licensing, LLC, Redmond, WA (US)

(72) Inventors: Patrick Aubrey Naylor, Reading (GB); Dushyant Sharma, Mountain House, CA (US); William Francis Ganong, III, Brookline, MA (US); Uwe Helmut Jost, Groton, MA (US); Ljubomir Milanovic, Vienna (AT)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 17/898,962

(22) Filed: Aug. 30, 2022

(65) Prior Publication Data
US 2024/0071396 A1    Feb. 29, 2024

(51) Int. Cl.
*G10L 19/018*   (2013.01)
*G10L 15/22*    (2006.01)
*G10L 25/21*    (2013.01)
*G10L 25/51*    (2013.01)

(52) U.S. Cl.
CPC ............ *G10L 19/018* (2013.01); *G10L 15/22* (2013.01); *G10L 25/21* (2013.01); *G10L 25/51* (2013.01)

(58) Field of Classification Search
CPC ....... G10L 19/018; G10L 15/22; G10L 25/21; G10L 25/51
USPC ............................ 704/200, 225, 226, 233
See application file for complete search history.

(56) References Cited

U.S. PATENT DOCUMENTS

| | | | |
|---|---|---|---|
| 10,236,006 B1 | 3/2019 | Gurijala et al. | |
| 2005/0033579 A1 | 2/2005 | Bocko et al. | |

OTHER PUBLICATIONS

"International Search Report and Written Opinion Issued in PCT Application No. PCT/US23/28902", Mailed Date: Oct. 18, 2023, 10 Pages.

*Primary Examiner* — George C Monikang
(74) *Attorney, Agent, or Firm* — Brian J. Colandreo; Heath M. Sargeant; Holland & Knight LLP

(57) ABSTRACT

A method, computer program product, and computing system for processing audio information associated with a speech processing system and encoding a watermark in a non-disruptive portion of the audio information.

15 Claims, 4 Drawing Sheets

SYSTEM AND METHOD FOR WATERMARKING AUDIO DATA FOR AUTOMATED SPEECH RECOGNITION (ASR) SYSTEMS

BACKGROUND

Ambient Cooperative Intelligence (ACI) may be used, e.g., to turn conversational speech and/or video information into transcriptions and formatted reports representing a particular encounter (e.g., an online or in-person meeting between individuals). As such, ACI may involve safeguarding access to encounter information that is processed into reports and transcriptions.

Additionally, conversational speech signals may be stored for use as training data to further enhance the accuracy of ACI machine learning models. However, proprietary training data may be used to train unauthorized machine learning models. Watermarking data provides the ability to determine the source of the data. However, conventional approaches to watermarking data compromise speech signals within audio information when processed by various speech processing systems or machine learning models.

BRIEF DESCRIPTION OF THE DRAWINGS

Like reference symbols in the various drawings indicate like elements.

DETAILED DESCRIPTION OF THE PREFERRED EMBODIMENTS

Figure 1:
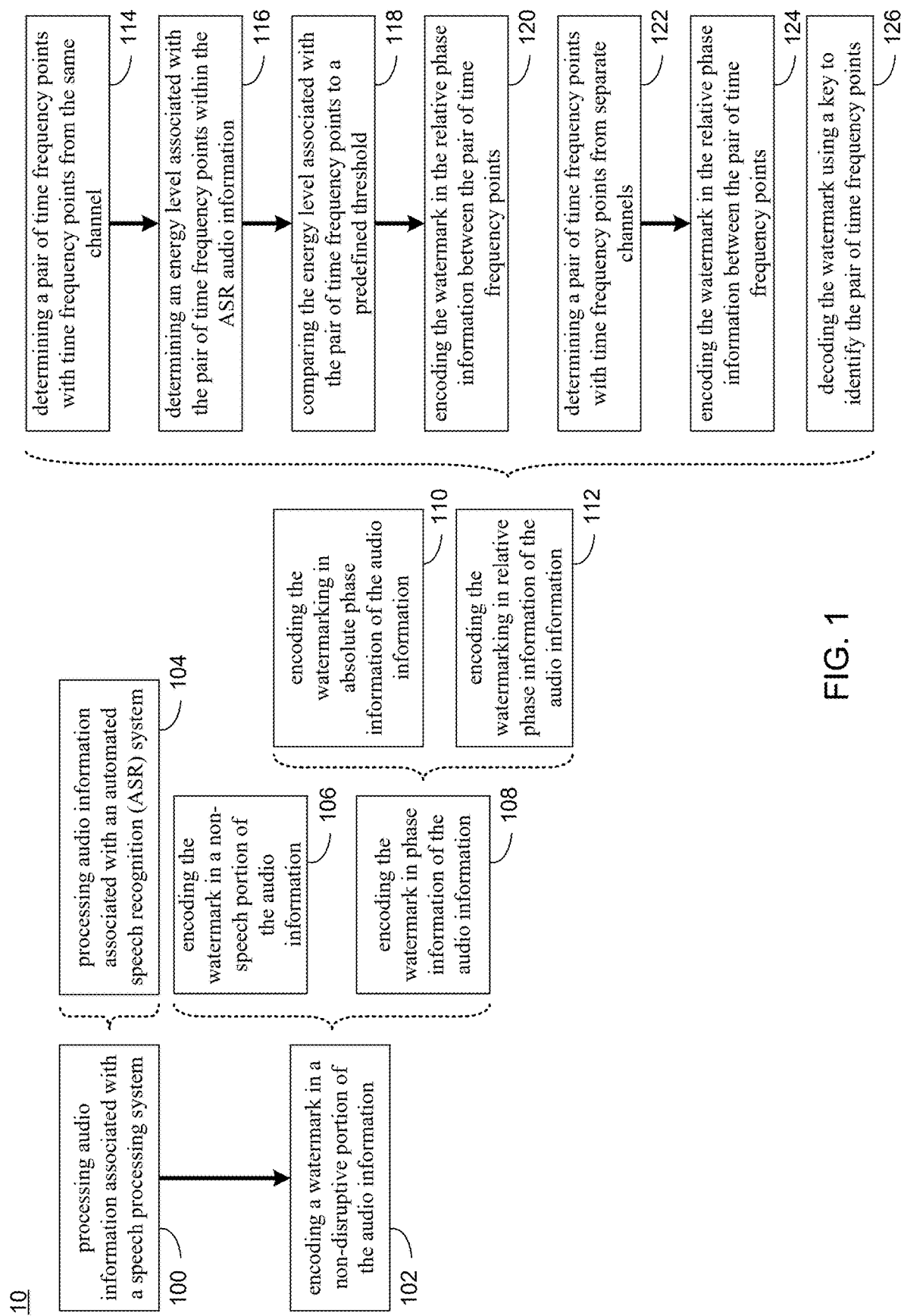
FIG. 1 is a flow chart of one implementation of a watermarking process.

As discussed above, speech signals/audio information is recorded and used with various speech processing systems and/or machine learning models. However, proprietary training data may be used to train unauthorized machine learning models. Watermarking data provides the ability to determine the source of the data. However, conventional approaches to watermarking data compromise speech signals within the audio information when processed by various speech processing systems or machine learning models.

As will be discussed in greater detail below, implementations of the present disclosure provide a technical solution necessarily rooted in computing technology to watermark audio information in a non-disruptive manner for automated speech recognition (ASR) audio information. Specifically, audio information is encoded with watermarks applied to non-disruptive portions. Non-disruptive portions of audio information include portions or properties that are not used to recognize or process speech components from the audio information. For example, conventional approaches to watermarking data are usually limited to a small amount of watermarking data that are susceptible to detection and removal or that interfere with substantive portions of the audio information. Implementations of the present disclosure are applied to ASR audio information generally to increase the likelihood that the watermarked audio information can be identified without compromising the speech processing features of the data and without being easily detected and vulnerable to removal.

The details of one or more implementations are set forth in the accompanying drawings and the description below. Other features and advantages will become apparent from the description, the drawings, and the claims.

The Watermarking Process:

Referring to FIGS. 1-4, watermarking process 10 processes 100 audio information associated with a speech processing system. A watermark is encoded 102 in a non-disruptive portion of the audio information.

In some implementations, watermarking process 10 processes 100 audio information associated with a speech processing system. Audio information associated with a speech processing system is a recording of audio information (e.g., audio encounter information as discussed above) for processing by, or for training of, a speech processing system. Examples of audio information include recordings of speech signals (e.g., a recording of a conversation between conversation participants), video recordings with an audio component, etc.

In some implementations, processing 100 audio information associated with a speech processing system includes 104 processing audio information associated with an automated speech recognition (ASR) system. Automated speech recognition (ASR) is an interdisciplinary subfield of speech processing that enable the recognition and translation of spoken language into text by computing devices. Certain portions of audio information are required for effective ASR while other portions are not needed. As will be discussed in greater detail below, watermarking process 10 preserves the portions of audio information necessary for ASR by using non-disruptive portions of the audio information for encoding watermarks. While reference is made to ASR, it will be appreciated that watermarking process 10 encodes watermarks in non-disruptive portions of audio information associated with any speech processing system (e.g., speaker recognition systems, voice biometric systems, speech diarization systems, etc.).

Suppose watermarking process 10 records a conversation between a doctor and a patient. In this example, the recorded audio information is captured for preserving the content of the conversation (e.g., content of the patient's appointment with the doctor) and for processing into a transcription using an ASR system. In this example, watermarking process 10 processes 100 audio information for storage in a storage device. For example, watermarking process 10 processes 100 audio information from an audio recording system and/or from another computing device for processing with an ASR system. In this example, watermarking process 10 processes 100 ASR audio information for temporary storage (e.g., to process the ASR audio information immediately), for storage until subsequent ASR processing or training (e.g., retaining in storage for future training or processing), and/or for long term storage (e.g., preserving the ASR audio information). As will be discussed in greater detail below, watermarking process 10 encodes 102 a watermark into non-disruptive portions of the audio information at the time of storage and/or during transmission of the audio information. In this manner, all audio information is written to storage media through a pipeline that encodes a watermark into the audio information. This ensures that audio data is watermarked and, therefore, traceable.

In some implementations, watermarking process 10 encodes 102 a watermark in a non-disruptive portion of the audio information. A watermark is metadata that describes data origination information (i.e., creator of the data, owner of the data, device(s) used to generate the data (e.g., microphone used to generate audio information), application(s)

used to generate the data, timestamp information, identification information for personal information within the data (e.g., audio information with speaker identity information), etc.). In some implementations, the watermark is detected and used to trace the use of the data back to an owner/source.

In some implementations, a non-disruptive portion of the audio information is any portion or property that is not used to recognize or process speech components from the audio information. For example, a non-disruptive portion is any portion or property that, if modified, would not change or impact speech processing (e.g., ASR) performed on the audio information. Examples of non-disruptive portions of speech processing audio information include non-speech portions (i.e., portions of audio information without speech components), noise components, phase information, high frequency information relative to the highest frequency used by speech processing systems (i.e., frequencies greater than 8 kHz), higher order Mel Frequency Cepstral Coefficients (MFCC) (i.e., MFCCs 1-12 are typically used in ASR applications so MFCCs 13 and above are non-disruptive), etc.

In some implementations, encoding 102 the watermark is the application of the watermark (e.g., insertion into or modification of the underlying data) to the audio information. In one example, watermarking process 10 encodes 102 the watermark by adding data (e.g., a value, a number of binary value, a signal, etc.) to the audio information. For example, a value (e.g., the name of the entity creating the audio information) is encoded 102 into the audio information by adding the data to audio information. In some implementations, watermarking process 10 uses a key to map desired data (e.g., ownership information, audio generation information, timestamp information, etc.) to predefined keys in a database. In this example, watermarking process 10 encodes a watermark as a key to an entry in a database.

In some implementations, encoding 102 the watermark in the non-disruptive portion of the ASR audio information includes encoding 106 the watermark in a non-speech portion of the ASR audio information. A non-speech portion of the audio information is a portion of the audio information that lacks speech component characteristics. For example and as discussed above, the human ear can perceive sounds with frequencies ranging from 20 Hz to 8 kHz with greater sensitivity between 1 kHz and 6 kHz. As such, portions of audio information outside of the defined range used by the ASR system represent non-speech portions. Another example of non-speech portions include noise components. In some implementations, watermarking process 10 identifies non-speech portions of the audio information. For example, watermarking process 10 uses a voice activity detector (VAD) to identify portions of the audio information with speech components (i.e., signal characteristics matching predefined patterns associated with speech). In this example, watermarking process 10 uses a VAD to identify the non-speech components for encoding 106 a watermark.

In another example, watermarking process 10 identifies non-speech portions by identifying noise components within audio information. As noise components do not contribute to most speech processing systems (e.g., ASR), these portions are watermarked without compromising speech processing of audio information. For example, while noise components do not constitute speech regions, adding too much distortion can adversely impact ASR processing. As such, watermarking process 10 uses the additional room/reduced sensitivity to modifications in the non-speech portions to watermark the audio information. In some implementations, watermarking process 10 uses an indication of spectral balance or noise threshold to watermark the audio information. In this manner, watermarking process 10 uses non-speech portions to encode a watermark without impacting speech processing associated with the audio information.

In some implementations, encoding 102 the watermark in the non-disruptive portion of the audio information includes encoding 108 the watermark in phase information of the audio information. Phase information is a description of the phase of the audio information. In the context of audio signals, phase is a definition of the position of a point in time on a waveform cycle where a complete cycle is defined as 360 degrees. Depending on the architecture of the ASR system, modifications to phase information are non-disruptive. For example, when MFCCs of speech are extracted from audio information, the ASR system does not use phase information during training or testing. In another example, when time domain waveforms are used for training an end-to-end speech processing system, the ASR system is at least cognizant of some phase information. Accordingly, watermarking process 10 determines the amount of sensitivity in the ASR system when encoding 108 a watermark in phase information. In this manner, phase information used by watermarking process 10 is a non-disruptive portion of ASR audio information (i.e., changes to phase information do not impact or change ASR processing).

In some implementations, encoding 108 the watermark in the phase information of the audio information includes encoding 110 the watermarking in absolute phase information of the audio information. Absolute phase information is a description of the absolute phase of the audio information. In the context of audio signals, absolute phase is the phase of the reproduced/recorded signal relative to the original signal. In some implementations, watermarking process 10 determines the absolute phase for the audio information. For example, watermarking process 10 determines the phase of the audio information relative to the original audio information (i.e., audio information prior to watermarking). In some implementations, watermarking process 10 encodes 110 the watermark into the absolute phase information by modifying the absolute phase of the audio information relative to the original signal. For example, watermarking process 10 modifies the absolute phase by modifying the phase of portions of the audio information with the watermark. For example and in some implementations, watermarking process 10 encodes 110 the watermark as phase modulation (i.e., encoding the watermark into variations of the phase of the audio information). In another example, watermarking process 10 modifies the absolute value of the phase over some duration of time (e.g., setting the phase to "0" for three 20 millisecond frames). In some implementations, the amount of absolute phase value modification is controlled by various parameters (e.g., the amount of change in phase permitted relative to the original phase, which frequency channels to distort, etc.). In this manner, watermarking process 10 encodes 110 the watermark into absolute phase information that is non-disruptive to the ASR processing of the audio information.

In some implementations, encoding 108 the watermark in the phase information of the audio information includes encoding 112 the watermarking in relative phase information of the audio information. Relative phase information is a description of the relative phase between a pair of points within the audio information. For example, within audio information, phase may change as a function of time and/or frequency. In some implementations and as discussed above, the amount of relative phase value modification is controlled by various parameters (e.g., the amount of change in phase permitted relative to the original phase, which frequency channels to distort, etc.). Accordingly, watermarking process 10 uses the differences of phase at multiple different time-frequency points to encode a watermark. A time frequency point is a measure of a signal property at a particular time and frequency.

Figure 2:
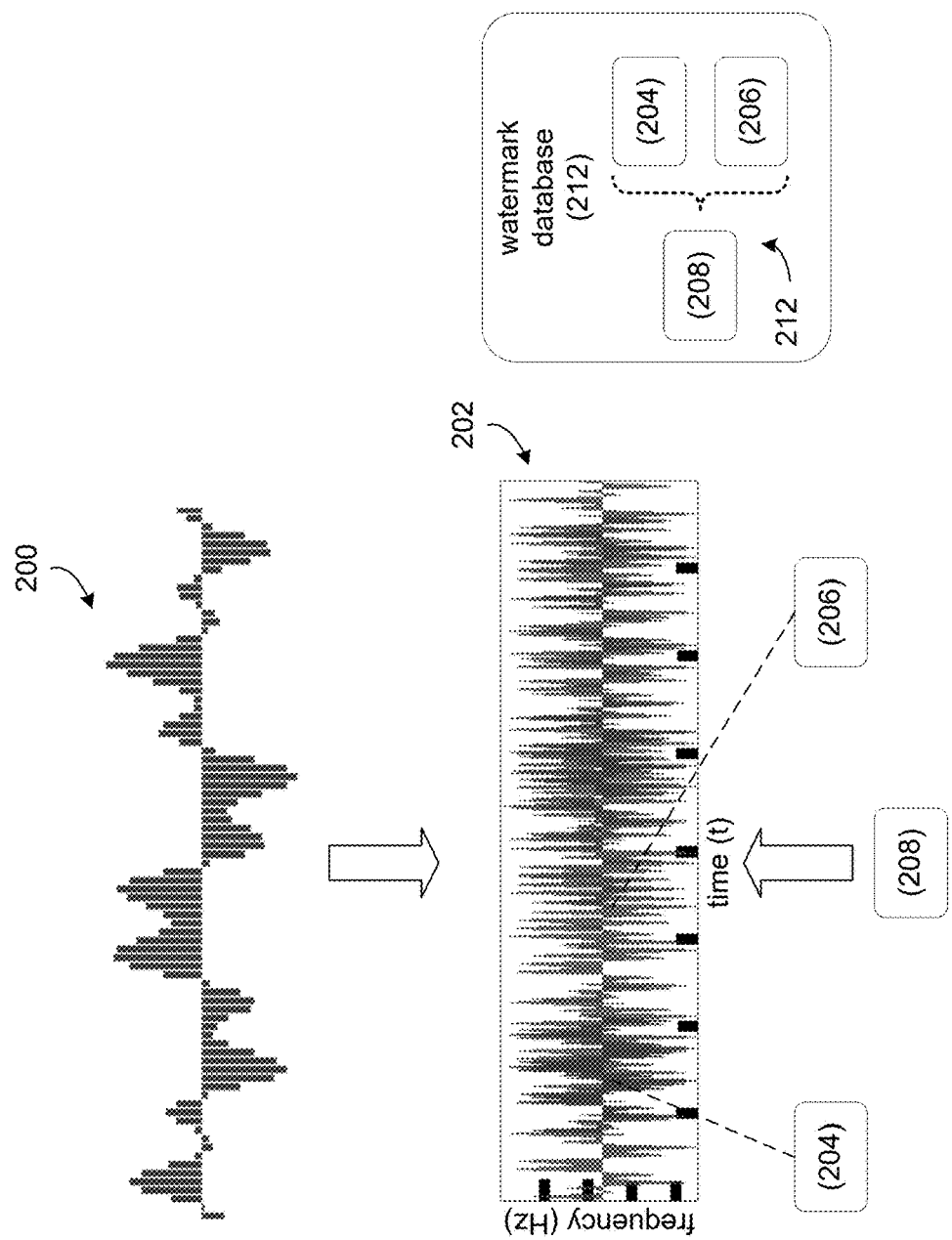
FIGS. 2-3 are diagrammatic views of the watermarking process of FIG. 1.

In some implementations, watermarking process 10 determines 114 a pair of time frequency points with time frequency points from the same channel. Referring also to FIG. 2, suppose watermarking process 10 receives 100 audio information 200 for storage. In this example, watermarking process 10 determines 114 a pair of time frequency points by generating a spectrogram of audio information 200. As shown in FIG. 2, spectrogram 202 is a representation of energy in the audio information as a function of time and frequency. In some implementations, watermarking process 10 selects a pair of time frequency points. For example, the selection may be random or may follow a predefined listing of time-frequency points. In some implementations, a "randomly" selected pair of time frequency points is known to watermarking process 10 in order to decode the encoded watermark.

In some implementations, determining 114 a pair of time frequency points includes determining 116 an energy level associated with the pair of time frequency points within the audio information. The energy level associated with a time frequency point is the energy or signal power at that time and frequency. For example, if there is no energy, watermarking process 10 may not be able to determine a phase for the time frequency point and/or may determine a phase of "0". In some implementations, determining an energy level associated with the pair of time frequency points includes determining the energy level of a particular frequency band. For example, watermarking process 10 determines 116 energy levels for larger portions of the audio information than individual time frequency points to reduce the amount of time required to identify a time frequency point with a threshold amount of energy.

In some implementations, watermarking process 10 compares 118 the energy level associated with the pair of time frequency points to a predefined threshold. For example, there needs to be energy to measure the phase and, the stronger the energy, the more accurate the determination of the phase for a time frequency point. Accordingly, watermarking process 10 uses the predefined energy threshold to determine that there is at least the threshold of energy at each frequency in order to reliably use the time frequency point to encode information. The predefined energy threshold is user-defined, a default value, or determined by watermarking process 10 based upon, at least in part, the audio information.

In some implementations, watermarking process 10 determines 114 a pair of time frequency points (e.g., a first point of: time "X" at frequency "Y" and a second point of time "P" at frequency "Q"). As shown in FIG. 2, watermarking process 10 determines 114 time frequency point 204 and time frequency point 206. So we would identify two time frequency points in the spectrogram of the signal.

In some implementations, encoding 112 the watermark in the relative phase information of the ASR audio information includes encoding 120 the watermark in the relative phase information between the pair of time frequency points from the same channel. For example, watermarking process 10 encodes 120 the watermark by modifying the relative phase between the pair of time frequency points to encode the watermark. In the simple case of a single value, watermarking process 10 encodes 120 the value as a function of the phase between the time frequency points. For example, to encode a "0", watermarking process 10 modifies the relative difference between the phases to be e.g., 180 degrees. To encode a "1", watermarking process 10 modifies the relative difference between the phases to be e.g., negative 180 degrees. Referring again to the example of FIG. 2, watermarking process 10 encodes 120 a watermark (e.g., watermark 208) in the relative phase difference between time frequency points 204, 206.

In some implementations, watermarking process 10 uses any number of time frequency points to encode any amount of information. For example, suppose a watermark includes a string of e.g., ten characters. In this example, watermarking process 10 determines 114 ten pairs of time frequency points and encodes 120 each value into the ten pairs of time frequency points as a phase difference between the individual time frequency points of a given pair. Accordingly, watermarking process 10 uses any number of time frequency pairs to encode 120 any amount of watermark data into the relative phase information of the time frequency pairs. In this manner, watermarking process 10 encodes various sized watermarks into non-disruptive portions of the ASR audio information.

In some implementations, the ability to decode the watermark depends upon a key describing which time frequency points to reference in order to obtain the watermark. For example, with each pair of time frequency points determined for encoding a watermark, watermarking process 10 records the time frequency points for reference during decoding. Referring again to FIG. 2, suppose that watermarking process 10 encodes watermark 208 in the relative phase difference between time frequency points 204, 206. In this example, watermarking process 10 records a key (e.g., key 210) mapping watermark 208 in audio information 200 to the relative phase difference between time frequency points 204, 206 in a database or other data structure (e.g., watermark database 212). In this manner, watermarking process 10 detects watermark 208 by referencing watermark database 210 for the specific time frequency points (e.g., time frequency points 204, 206).

Figure 3:
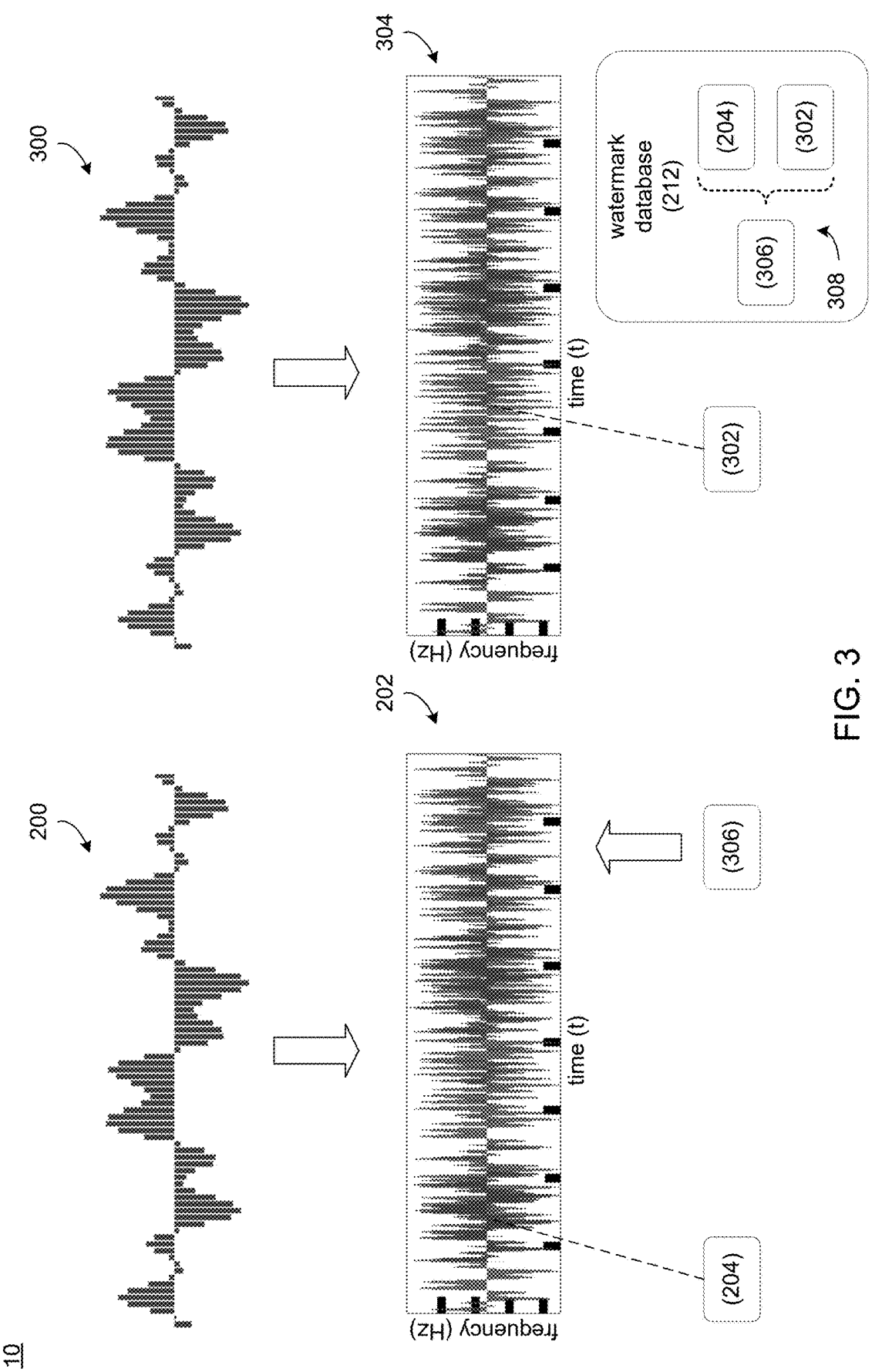

In some implementations, watermarking process 10 determines 122 a pair of time frequency points with time frequency points from separate channels. For example, suppose audio information includes multichannel audio information (e.g., audio information recorded using multiple microphones). Each channel includes particular audio information specific to that channel. Accordingly, watermarking process 10 uses non-disruptive portions of the audio information across channels to encode a watermark. Referring also to FIG. 3, suppose that audio information includes multichannel audio information with audio information 200 from a first channel and audio information 300 from a second channel. In this example, watermarking process 10 determines 122 a pair of time frequency points with frequency points from separate channels (e.g., time frequency point 204 from spectrogram 202 of audio information 200 and time frequency point 302 from spectrogram 304 of audio information 300). As discussed above, watermarking process 10 generates a key (e.g., key 308) for mapping watermark 306 to time frequency points 204, 302. In this manner, watermarking process 10 decodes watermark 306 by using key 308 to identify time frequency points 204, 302.

In some implementations involving multiple channels of audio information (e.g., from a microphone array recording device), encoding 112 the watermark in the relative phase information of the audio information includes encoding 124 the watermark in the relative phase information between the pair of time frequency points from the separate channels. Referring again to FIG. 3, watermarking process 10 encodes 124 a watermark (e.g., watermark 306) in the relative phase difference between time frequency points 204, 302. For example and in order to avoid disrupting multichannel speech signal processing (e.g., beamforming), watermarking process 10 modifies a limited number of time frames and frequency channels. In one example, watermarking process 10 uses a threshold (e.g., a user-defined threshold, a pre-defined threshold, or a threshold generated by watermarking process 10) to determine the number of and location of (e.g., time frames and frequency channels) relative phase modifications. In this manner, watermarking process 10 uses non-disruptive portions in multichannel ASR audio information to encode a watermark without compromising ASR performance.

In some implementations, watermarking process 10 decodes 126 the watermark using a key to identify the pair of time frequency points. As discussed above, when determining or identifying pairs of time frequency points, watermarking process 10 generates a watermark database (e.g., watermark database 212) with various keys or entries (e.g., key 212 as shown in FIG. 2 and key 308 as shown in FIG. 3) mapping watermarks to particular pairs of time frequency points. By using keys in a watermark database to map watermarks to the relative phase difference between time frequency pairs, watermarking process 10 is more secure and has a higher potential for payload without adding distortions detrimental to speech processing (e.g., ASR) performance. In some implementations, watermarking process 10 decodes 126 a particular watermark by using the key and identifying the time frequency pairs. Watermarking process 10 decodes the watermark by determining the relative phase difference between the identified time frequency pairs. In this manner, watermarking process 10 encodes and decodes a watermark in non-disruptive portions of audio information without impacting speech processing system (e.g., ASR) performance.

Figure 4:
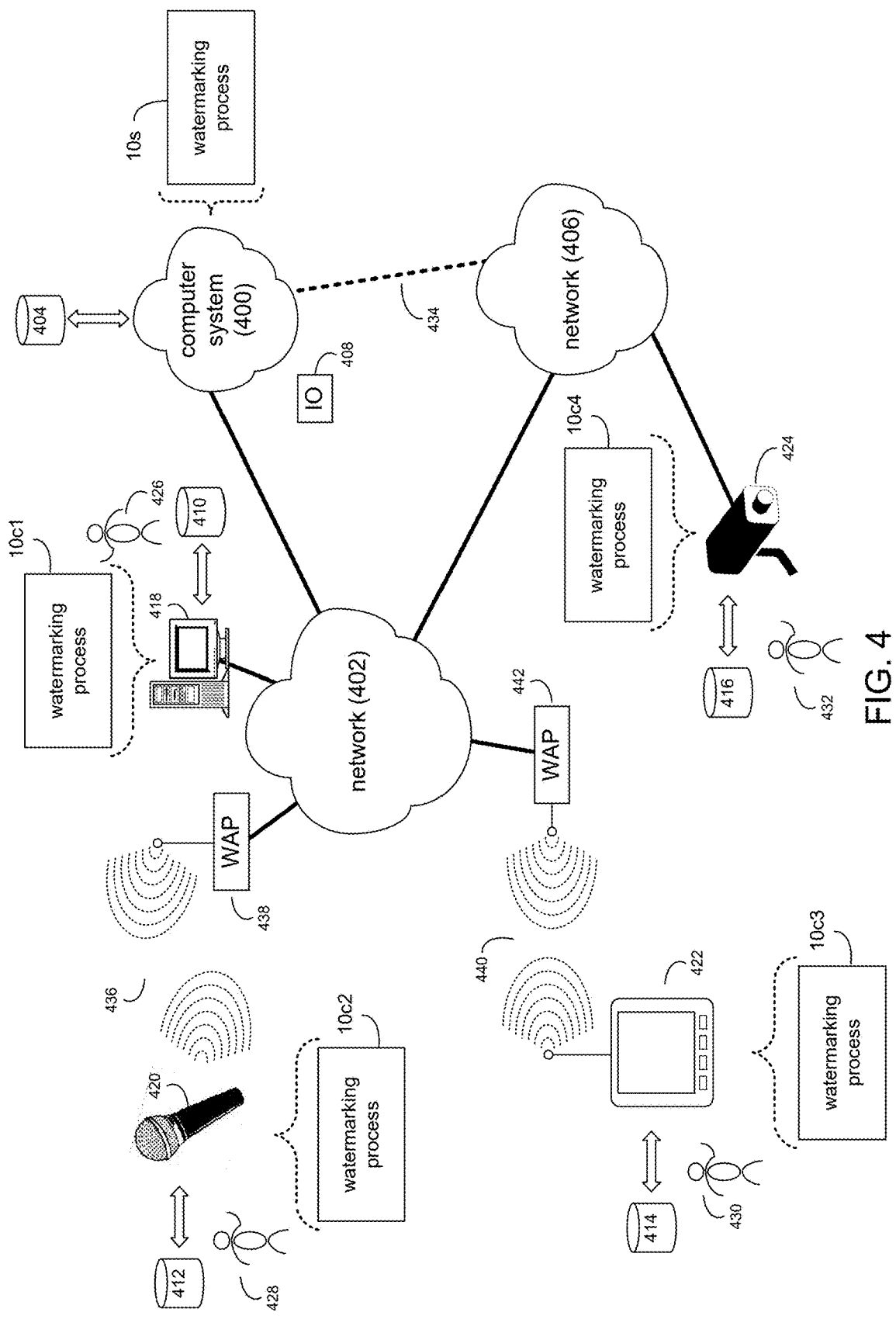
FIG. 4 is a diagrammatic view of a computer system and the watermarking process coupled to a distributed computing network.

System Overview:

Referring also to FIG. 4, there is shown watermarking process 10. Watermarking process 10 may be implemented as a server-side process, a client-side process, or a hybrid server-side/client-side process. For example, watermarking process 10 may be implemented as a purely server-side process via watermarking process 10s. Alternatively, watermarking process 10 may be implemented as a purely client-side process via one or more of watermarking process 10c1, watermarking process 10c2, watermarking process 10c3, and watermarking process 10c4. Alternatively still, watermarking process 10 may be implemented as a hybrid server-side/client-side process via watermarking process 10s in combination with one or more of watermarking process 10c, watermarking process 10c2, watermarking process 10c3, and watermarking process 10c4.

Accordingly, watermarking process 10 as used in this disclosure may include any combination of watermarking process 10s, watermarking process 10c1, watermarking process 10c2, watermarking process 10c3, and watermarking process 10c4.

Watermarking process 10s may be a server application and may reside on and may be executed by a computer system 400, which may be connected to network 402 (e.g., the Internet or a local area network). Computer system 400 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 400 may execute one or more operating systems.

The instruction sets and subroutines of watermarking process 10s, which may be stored on storage device 404 coupled to computer system 400, may be executed by one or more processors (not shown) and one or more memory architectures (not shown) included within computer system 400. Examples of storage device 404 may include but are not limited to: a hard disk drive; a RAID device; a random access memory (RAM); a read-only memory (ROM); and all forms of flash memory storage devices.

Network 402 may be connected to one or more secondary networks (e.g., network 404), examples of which may include but are not limited to: a local area network; a wide area network; or an intranet, for example.

Various IO requests (e.g., IO request 408) may be sent from watermarking process 10s, watermarking process 10c1, watermarking process 10c2, watermarking process 10c3 and/or watermarking process 10c4 to computer system 400. Examples of IO request 408 may include but are not limited to data write requests (i.e., a request that content be written to computer system 400) and data read requests (i.e., a request that content be read from computer system 400).

The instruction sets and subroutines of watermarking process 10c1, watermarking process 10c2, watermarking process 10c3 and/or watermarking process 10c4, which may be stored on storage devices 410, 412, 414, 416 (respectively) coupled to client electronic devices 418, 420, 422, 424 (respectively), may be executed by one or more processors (not shown) and one or more memory architectures (not shown) incorporated into client electronic devices 418, 420, 422, 424 (respectively). Storage devices 410, 412, 414, 416 may include but are not limited to: hard disk drives; optical drives; RAID devices; random access memories (RAM); read-only memories (ROM), and all forms of flash memory storage devices. Examples of client electronic devices 418, 420, 422, 424 may include, but are not limited to, personal computing device 418 (e.g., a smart phone, a personal digital assistant, a laptop computer, a notebook computer, and a desktop computer), audio input device 420 (e.g., a handheld microphone, a lapel microphone, an embedded microphone (such as those embedded within eyeglasses, smart phones, tablet computers and/or watches) and an audio recording device), display device 422 (e.g., a tablet computer, a computer monitor, and a smart television), machine vision input device 424 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 426, 428, 430, 432 may access computer system 400 directly through network 402 or through secondary network 406. Further, computer system 400 may be connected to network 402 through secondary network 406, as illustrated with link line 434.

The various client electronic devices (e.g., client electronic devices 418, 420, 422, 424) may be directly or indirectly coupled to network 402 (or network 406). For example, personal computing device 418 is shown directly coupled to network 402 via a hardwired network connection. Further, machine vision input device 424 is shown directly coupled to network 406 via a hardwired network connection. Audio input device 420 is shown wirelessly coupled to network 402 via wireless communication channel 436 established between audio input device 420 and wireless access point (i.e., WAP) 438, which is shown directly coupled to network 402. WAP 438 may be, for example, an IEEE 802.11a, 802.11b, 802.11g, 802.11n, Wi-Fi, and/or Bluetooth™ device that is capable of establishing wireless communication channel 436 between audio input device 418 and WAP 438. Display device 422 is shown wirelessly coupled to network 402 via wireless communication channel 440 established between display device 422 and WAP 442, which is shown directly coupled to network 402.

The various client electronic devices (e.g., client electronic devices 418, 420, 422, 424) may each execute an operating system, wherein the combination of the various client electronic devices (e.g., client electronic devices 418, 420, 422, 424) and computer system 400 may form modular system 444.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 402).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   processing audio information associated with a speech processing system;
   encoding a watermark in a non-disruptive portion of the audio information during storage and/or transmission of the audio information including:
      determining a pair of time frequency points with time frequency points from a same channel;
      generating a watermark database with a plurality of keys mapping a plurality of watermarks to particular pairs of time frequency points for determining or identifying the particular pairs of time frequency points; and
      recording a key mapping the watermark in the audio information to a relative phase difference between the pair of time frequency points from the same channel in the watermark database; and
   decoding the watermark using the key from the watermark database to identify the pair of time frequency points and by determining the relative phase difference between the identified pair of time frequency points.

2. The computer-implemented method of claim 1, wherein processing the audio information associated with the speech processing system includes:
   processing audio information associated with an automated speech recognition (ASR) system, thus defining ASR audio information.

3. The computer-implemented method of claim 1, wherein encoding the watermark in the non-disruptive portion of the audio information includes:
   encoding the watermark in a non-speech portion of the audio information.

4. The computer-implemented method of claim 1, wherein encoding the watermark in the non-disruptive portion of the audio information includes:
   encoding the watermark in phase information of the audio information.

5. The computer-implemented method of claim 3, wherein encoding the watermark in the phase information of the audio information includes:
   encoding the watermarking in absolute phase information of the audio information.

6. The computer-implemented method of claim 3, wherein encoding the watermark in the phase information of the audio information includes:
   encoding the watermarking in relative phase information of the audio information.

7. The computer-implemented method of claim 5, further comprising:
   determining a pair of time frequency points with time frequency points from separate channels; and
   encoding the watermark in the relative phase information between the pair of time frequency points.

8. A computing system comprising:
   a memory; and
   a processor configured to process automated speech recognition (ASR) audio information for storage and/or transmission, wherein the processor is further configured to encode a watermark in phase information of the ASR audio information during the storage and/or transmission of the ASR audio information including: to determine a pair of time frequency points with time frequency points from a same channel, to generate a watermark database with a plurality of keys mapping a plurality of watermarks to particular pairs of time frequency points for determining or identifying the particular pairs of time frequency points, and to record a key mapping the watermark in the ASR audio information to a relative phase difference between the pair of time frequency points from the same channel in the watermark database, and wherein the processor is further configured to decode the watermark using the key from the watermark database to identify during the storage and/or transmission of the ASR audio information including the pair of time frequency points and by determining the relative phase difference between the identified pair of time frequency points.

9. The computing system of claim 8, wherein encoding the watermark in the phase information of the ASR audio information includes at least one of:
   encoding the watermarking in absolute phase information of a single channel of the ASR audio information; and
   encoding the watermarking in relative phase information of a single channel of the ASR audio information.

10. The computing system of claim 9, wherein the processor is further configured to:
    determine a pair of time frequency points with time frequency points from separate channels; and encode the watermark in the relative phase information between the pair of time frequency points.

11. A computer program product residing on a non-transitory computer readable medium having a plurality of instructions stored thereon which, when executed by a processor, cause the processor to perform operations comprising:
processing automated speech recognition (ASR) audio information for storage and/or transmission;
determining a pair of time frequency points within the ASR audio information with time frequency points from a same channel; and
encoding a watermark in relative phase information of the ASR audio information between the pair of time frequency points during storage and/or transmission of the audio information including:
generating a watermark database with a plurality of keys mapping a plurality of watermarks to particular pairs of time frequency points for determining or identifying the particular pairs of time frequency points; and
recording a key mapping the watermark in the ASR audio information to a relative phase difference between the pair of time frequency points from the same channel in the watermark database; and
decoding the watermark using the key from the watermark database to identify the pair of time frequency points and by determining the relative phase difference between the identified pair of time frequency points.

12. The computer program product of claim 11, wherein determining the pair of time frequency points within the ASR audio information includes:
determining a pair of time frequency points with time frequency points from the same channel of the ASR audio information.

13. The computer program product of claim 11, wherein determining the pair of time frequency points within the ASR audio information includes:
determining a pair of time frequency points with time frequency points from separate channels of multichannel ASR audio information.

14. The computer program product of claim 11, wherein determining the pair of time frequency points within the ASR audio information includes:
determining an energy level associated with the pair of time frequency points within the ASR audio information.

15. The computer program product of claim 14, wherein determining the pair of time frequency points within the ASR audio information includes:
comparing the energy level associated with the pair of time frequency points to a predefined threshold.

* * * * *